United States Patent [19]

Scott

[11] 4,083,358
[45] Apr. 11, 1978

[54] SOLAR REFLECTOR COLLECTOR

[76] Inventor: William J. Scott, 2013 Heather Dr., Monterey Park, Calif. 91754

[21] Appl. No.: 684,496

[22] Filed: May 10, 1976

[51] Int. Cl.² .............................................. F24J 3/02
[52] U.S. Cl. .................................. 126/271; 126/270; 237/1 A; 165/168
[58] Field of Search ............... 126/270, 271; 237/1 A; 165/168–170

[56] References Cited

U.S. PATENT DOCUMENTS

| 272,927 | 2/1883 | Williams | 165/75 |
|---|---|---|---|
| 1,325,596 | 12/1919 | Trosper | 126/271 |
| 1,473,018 | 11/1923 | Danner | 126/271 |
| 2,830,799 | 4/1958 | Amerio | 165/170 X |
| 3,299,881 | 1/1967 | Koch | 126/271 |
| 3,587,559 | 6/1971 | Nonaka | 126/271 |
| 3,981,294 | 9/1976 | Deminet et al. | 126/271 |

FOREIGN PATENT DOCUMENTS

| 1,351,722 | 5/1974 | United Kingdom | 126/270 |

Primary Examiner—William F. O'Dea
Assistant Examiner—Larry Jones
Attorney, Agent, or Firm—William W. Haefliger

[57] ABSTRACT

A highly efficient solar reflector collector comprises:

(a) a receptacle, (b) a first translucent panel in the receptacle to pass solar radiation into the receptacle interior (c) auxiliary panel means extending within the receptacle to form first and second chambers at opposite sides of the second panel means and within the receptacle, (d) heat reflecting material in the receptacle facing said panels, and (e) fluid passing tubing stretches in said chambers to receive solar radiation transmitted through said panels and to receive radiation reflected from said material, the tubing stretches extending in such close relation as to radiate heat between themselves while passing radiation therebetween for impingement on and reflection from said reflecting material.

12 Claims, 4 Drawing Figures

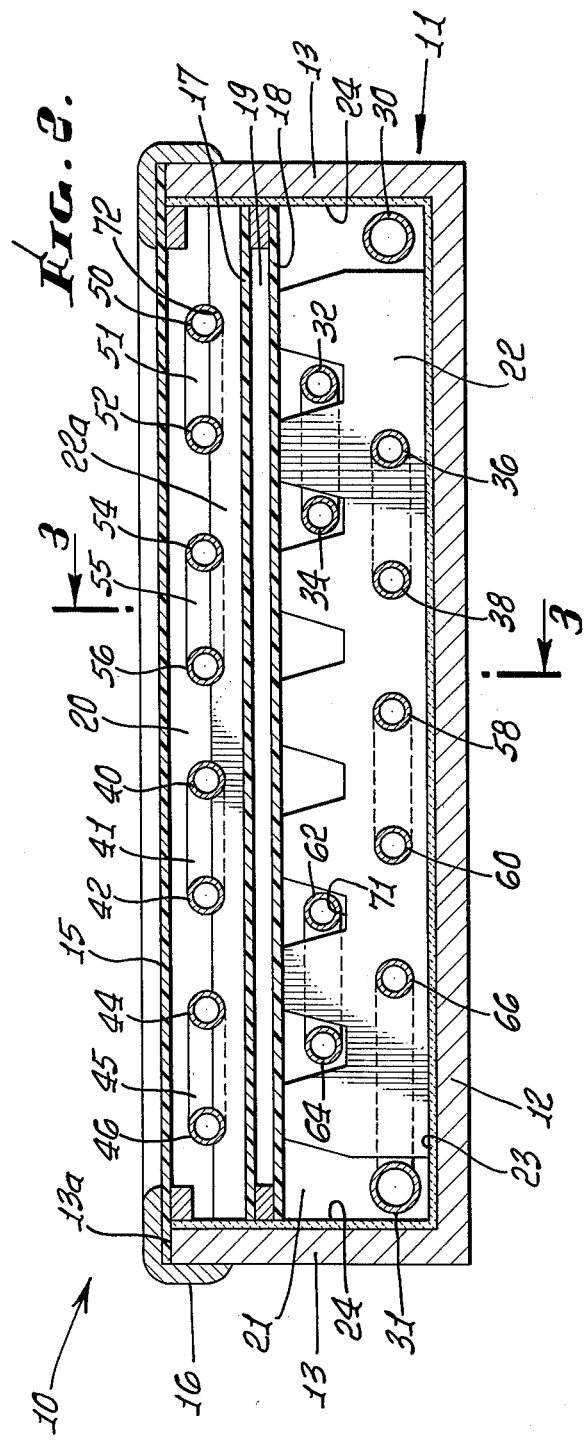
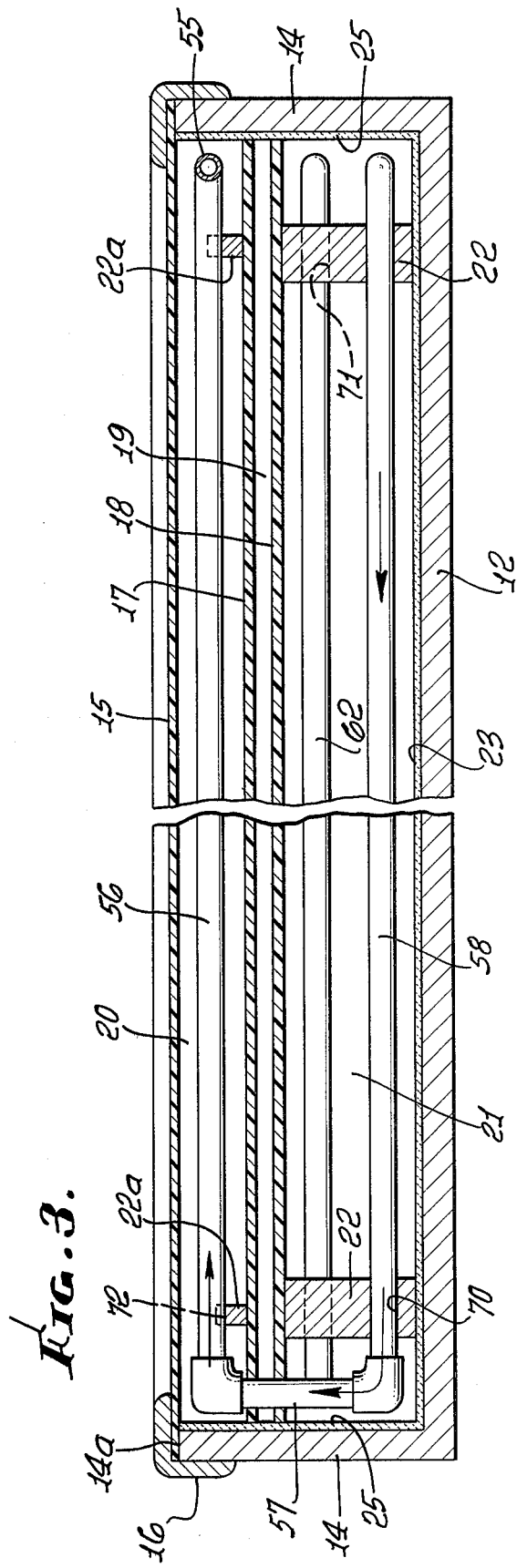

SOLAR REFLECTOR COLLECTOR

BACKGROUND OF THE INVENTION

This invention relates generally to solar heating and more specifically concerns a highly efficient solar reflector collector.

The need for efficient and effective solar heating apparatus has become more and more critical in recent years; however, known apparatus is bulky and has not achieved desired high ratios of BTU collection per unit area of exposure to the sun. Also, developing needs for desired low maintenance, simple, high efficiency apparatus have not been met. No one, to my knowledge, has provided the unusual advantages in construction, mode of operation and improved results now made possible by the present invention.

SUMMARY OF THE INVENTION

It is a major object of the invention to provide a solar reflector collector meeting the above needs and achieving very high ratios of heat collection per unit area of exposed surface. As will be seen, the apparatus is characterized by great simplicity, low maintenance, few parts, and lack of need for glycol or liquid-to-liquid heat exchange operation.

Basically, the apparatus comprises, in combination:

(a) a receptacle, (b) a first translucent panel in the receptacle to pass solar radiation into the receptacle interior (c) auxiliary panel means extending within the receptacle to form first and second chambers at opposite sides of the second panel means and within the receptacle, (d) heat reflecting material in the receptacle facing said panels, and (e) fluid passing tubing stretches in said chambers to receive solar radiation transmitted through said panels and to receive radiation reflected from said material, the tubing stretches extending in such close relation as to radiate heat between themselves while passing radiation therebetween for impingement on and reflection from said reflecting material.

Further, and as will be seen, certain of the stretches extend in the first or super-heat chamber, other of the stretches extend in the second or heating chamber; the stretches in the two chambers may be connected in two independent branches each of which extends in both chambers and in a manner to achieve maximum heating efficiency in relation to the reflection material lining the chamber and the panels; and the two chambers may be separated by two radiation passing panels which form an insulating "dead air" chamber so as to enhance and trap the heat in the super-heat chamber. Accordingly, liquid such as water in the tubing stretches is heated both directly and indirectly by solar radiation, and also by conduction in both chambers as well as radiation between the stretches, the arrangement achieving previously unknown efficiencies.

These and other objects and advantages of the invention, as well as the details of an illustrative embodiment, will be more fully understood from the following description and drawings, in which:

DRAWING DESCRIPTION

FIG. 2 is an enlarged vertical section on lines 2—2 of FIG. 1;

FIG. 3 is a vertical section on lines 3—3 of FIG. 2; and

DETAILED DESCRIPTION

Figure 1:
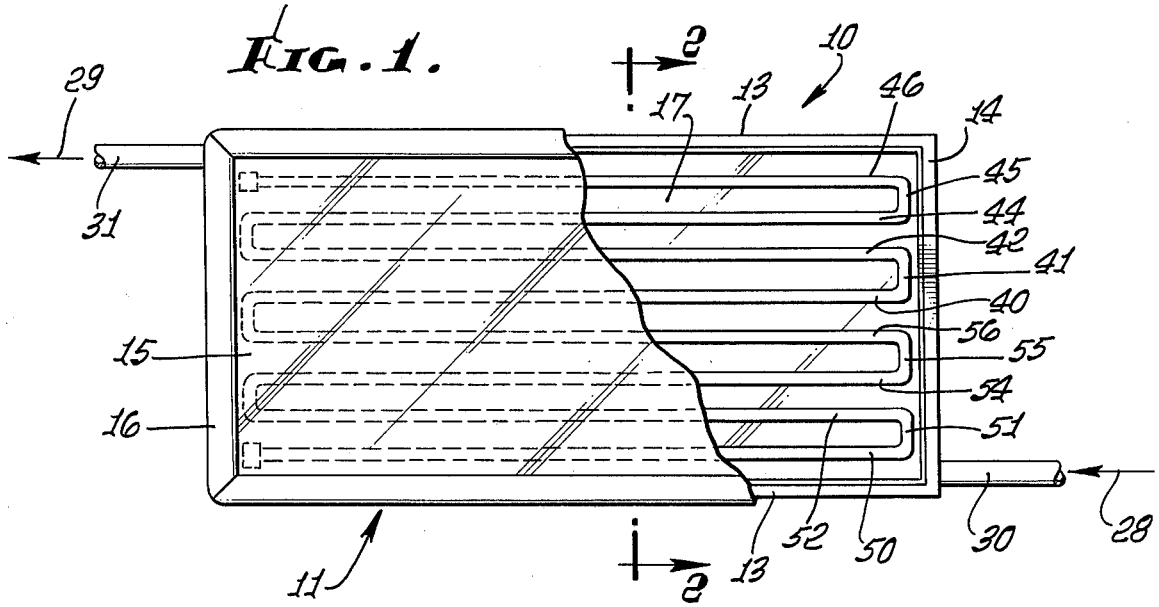
FIG. 1 is a plan view, partly broken away to show interior construction of a reflector-collector.
Figure 4:
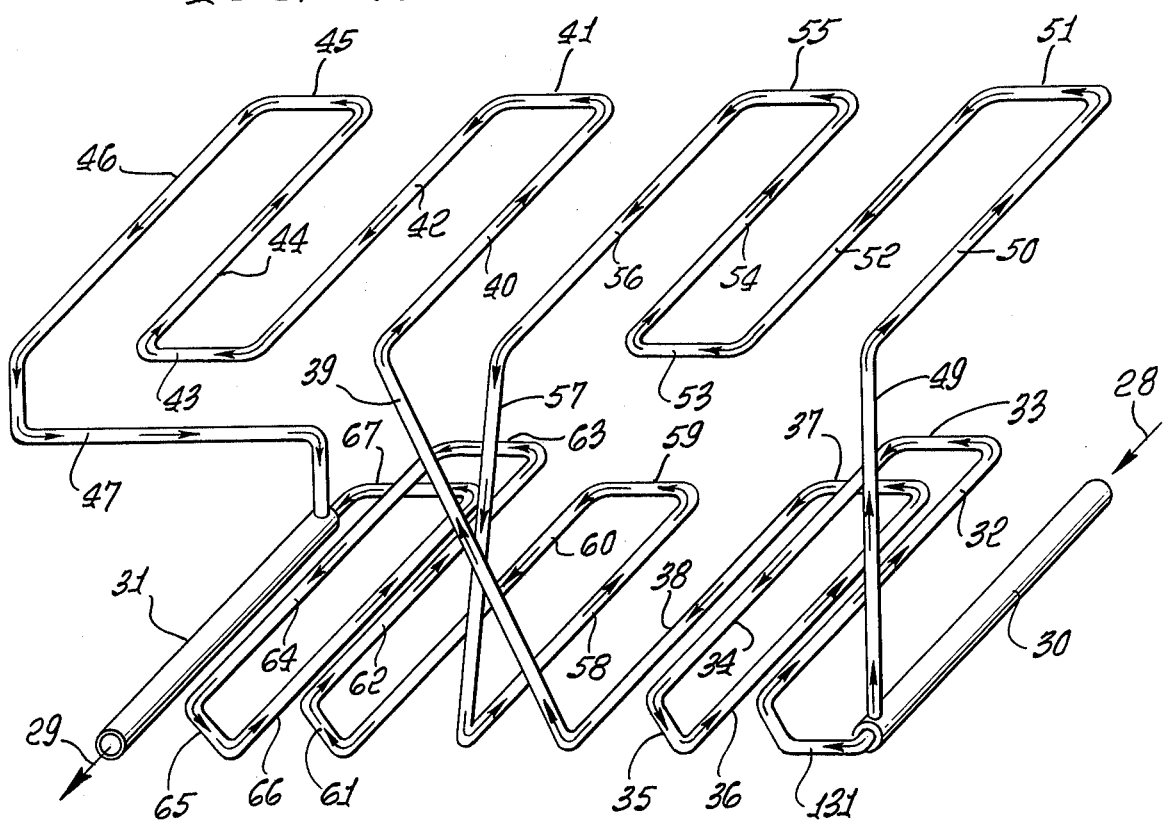
FIG. 4 is a schematic showing of the tubing organization employed in FIGS. 1, 2 and 3.

In the drawings, a solar reflector collector 10 comprises a receptacle 11 having a bottom wall 12, side walls 13 and end walls 14. The receptacle is shown as rectangular, but may have other shapes; also, the wall material may consist of wood or other insulative substance such as plastic.

A first translucent panel 15 extends across the top of the receptacle and may for example be retained in position against the wall rims 13a and 14a as by a seal or retainer 16, as shown. Second and third translucent panels 17 and 18 extend across the interior of the receptacle in closely spaced parallel relation, to provide a vapor chamber 19 therebetween. An upper heating chamber 20 is formed between panels 15 and 17, and a lower, super-heating chamber 21 is formed beneath panel 18, the vertical height of chamber 21 being such as to accommodate multiple (as for example two) layers of tubing stretches, whereas the vertical height of chamber 20 typically being less than that of chamber 21 to accommodate a lesser number (as for example one) layers of tubing stretches. Longitudinally extending, laterally spaced upright supports 22 in chamber 21 support panel 18, and spacers 22a in chamber 19 support panel 17. The bottom and side walls of the receptacle are typically lined with reflective material, as for example sheeting such as aluminum foil at 23-25. Accordingly, sunlight entering the receptacle and striking the reflective material at an angle will be reflected, ordinarily to impinge ultimately on the infra-red radiation absorbing tubing stretches which may be darkened to efficiently absorb such solar radiation. Note that the tubing stretches are strategically located within the chambers 20 and 21 to "capture" a maximum amount of the radiation entering the receptacle, whether by direct impingement on the pipe or tubing stretches without prior reflection, or by indirect impingement after such reflection or after multiple reflection from different reflective areas. Also, the stretches radiate infra-red rays for direct impingement on other pipe stretches or indirect impingement on other pipe stretches after reflection, so that virtually no heat is lost once it enters the receptacle. Air in the chambers is also heated by contact with the pipe stretches to transfer heat to other pipe stretches. Note that upper chamber 19 provides an insulative barrier between chambers 21 and 20, and acts to prevent or inhibit conduction of heat from "very" hot air in chamber 21 to hot air in chamber 20, whereby the air in chamber 21 is kept "very" hot, relatively, for high efficiency. The panels 15, 17 and 18 may consist of plastic material such as FILON, a product of Vistron Corporation, Hawthorne, Calif. (ASTM D648), or glass with a coating of TEDLAR, a product of E. I. duPont deNemours.

In accordance with an important aspect of the invention, fluid passing tubular stretches are located in the chambers 20 and 21 to receive direct solar radiation transmitted through the panels, as well as indirect radiation reflected from the heat reflecting material as at 23-25. The tubing stretches, through which water may be passed, extend in such close relation as to effectively radiate heat between themselves as well as passing solar radiation therebetween for impingement on the reflecting material. For example, the stretches typically extend in parallel, offset relation with respect to verticals from planes defined by the layer or row of stretches in chamber 20 and the two layers or rows of stretches in chamber 21. In addition, the stretches typically have radiation absorbing and radiating darkened (as for example blackened) outer surfaces.

More specifically, the receptacle 11 has an end inlet 28 passing an inlet pipe 30, and an end outlet 29 passing an outlet pipe 31. Both pipes extend longitudinally in the lower interior of chamber 21, and adjacent the respective walls 13. Certain primary branch tubing stretches 32, 34, 36 and 38 extend longitudinally in end-to-end fluid passing relation in one half of super-heating first chamber 21. Note the end turn 131 connecting inlet tube 30 with stretch 32, and the end turns 33, 35 and 37 connecting the stretches 32, 34, 36 and 38 in end-to-end relation. Stretches 36 and 38 extend in the bottom row or plane along with inlet pipe 30, and stretches 32 and 34 extend in the upper row or plane, in super-heat chamber 21, and in vertically offset relation to stretches 36 and 38. Other primary branch tubing stretches 40, 42, 44 and 46 extend longitudinally in end-to-end fluid passing relation in the opposite half of the second or heating chamber 20. A cross-over stretch 39 passes upwardly at the ends of the panels 17 and 18 and interconnects stretches 38 and 40. Note end-turns 41, 43 and 45 interconnecting the stretches 40, 42, 44 and 46. End stretch 47 connects stretch 46 with outlet tubing 31.

In addition, a secondary branch of tubing stretches includes other stretches 50, 52, 54 and 56 extending longitudinally in laterally spaced relation in one-half of heating or second chamber 20. Note the riser stretch 49 connecting inlet pipe 30 with stretch 50, and end turns 51, 53 and 55 connecting the stretches 50, 52, 54 and 56 in end-to-end fluid passing relation. The secondary branch also includes certain tubing stretches 58, 60, 62, 64 and 66 in the other half of the first or super-heating chamber 21. A cross-over stretch 57 passes downwardly at the ends of the panels 17 and 18 and interconnects stretches 56 and 58; also, end-turns 59, 61, 63, 65 and 67 interconnect the stretches 58, 60, 62, 64, 66 and outlet tube 31 in end-to-end fluid passing relation. Stretches 58, 60 and 66 extend in a lower row and stretches 62 and 64 in an upper row, in chamber 21, with vertical offsetting.

Accordingly, fluid such as water flowing in each of the two branches is heated in each of the heating and super-heating chambers, and by direct solar radiation, reflected solar radiation, radiation of heat between the tubing stretches, and conduction of heat by air trapped in the two chambers 20 and 21. Dead air third chamber 19 insulates chambers 20 and 21 from each other whereby air in chamber 21 achieves a much higher temperature to "super-heat" the tubing stretches in chamber 21 and the fluid therein; at the same time, solar radiation may pass through the "insulating" chamber 19 to heat the tubing stretches in the chamber. The temperature in chamber 21 will ordinarily reach in excess of 200° F.

Finally, longitudinally extending, laterally spaced supports 22 in chamber 21 may contain drilled openings as at 70 to pass the lower row stretches 36, 38, 58, 60 and 66; also these supports may be notched as at 71 to pass upper row stretches 32, 34, 62 and 64. Supports 22a in chamber 25 may be notched as at 72 to support stretches 50, 52, 54, 56, 40, 42, 44 and 46.

The reflective material 23–25 may consist of polymethane laminated fiberglass, metallized on either or both sides, such as Astrolon I, a product of King Sealey Thermos Co., Winchester, Pa. Such reflective material is relatively light weight.

I claim:

1. In a solar reflector-collector, the combination comprising
   (a) a receptacle,
   (b) a first translucent panel in the receptacle to pass solar radiation into the receptacle interior
   (c) auxiliary translucent panel means extending within the receptacle to form first and second chambers at opposite sides of the auxiliary panel means and within the receptacle,
   (d) heat reflecting material in the receptacle facing said panels, and
   (e) fluid passing heat absorbing tubing stretches in said chambers and spaced from the panels to receive solar radiation transmitted through said panels and to receive radiation reflected from said material, the tubing stretches in said first and second chambers being in fluid communication with each other, the tubing stretches extending in such close relation as to radiate heat between themselves while passing radiation therebetween for impingement on and reflection from said reflecting material, said heat reflecting material located at the bottom of the first chamber and at the sides of the first and second chambers, said stretches extending in layers generally parallel to said reflecting material at the bottom of the first chamber.

2. The combination of claim 1 wherein tubing stretches extend in parallel, offset relation.

3. The combination of claim 2 wherein tubing stretches have radiation absorbing darkened surfaces.

4. The combination of claim 1 wherein certain of said stretches extend in the first chamber and others of said stretches extend in the second chamber, said certain stretches being in end-to-end fluid passing communication, and said other stretches are in end-to-end fluid passing communication, and also in communication with said certain stretches, there being an inlet tube communicating with primary and secondary branch tubing stretches, and an outlet tube communicating with said primary and secondary branch tubing stretches, each of said branches including tubing stretches in each of said first and second chambers.

5. The combination of claim 4 wherein each branch includes tubing stretches in at least two rows in the first chamber and in at least one row in the second chamber, there being cross-over tubing stretches extending between the first and second chambers to interconnect the tubing stretches of the first branch in the two chambers, and to interconnect the tubing stretches of the secondary branch in the two chamber.

6. The combination of claim 4 wherein said certain stretches extend in closely adjacent pairs.

7. The combination of claim 6 wherein the stretches extend in rows in both chambers, the rows in the two chambers mutually overlapping to provide open radiation passages between the rows in directions between said panels and said reflection material.

8. The combination of claim 7 including supports for the tubing stretches in each of the first and second chambers.

9. The combination of claim 4 wherein said certain stretches are in end-to-end fluid passing communication, and said other stretches are in end-to-end fluid passing communication, and also in communication with said certain stretches.

10. The combination of claim 9 including an inlet tube communicating with primary and secondary branch tubing stretches, and an outlet tube communicating with said primary and secondary branch tubing stretches, each of said branches including tubing stretches in each of said first and second chambers.

11. The combination of claim 1 wherein said auxiliary translucent panel means comprises at least two panels forming a third chamber between said first and second chambers, whereby said first chamber comprises a super-heating chamber and said second chamber comprises a heating chamber.

12. The combination of claim 11 wherein said first, second and third chambers contain air, the height of said first chamber exceeding the height of the second chamber, and the height of the second chamber exceeding, the height of the third chamber.

* * * * *